(No Model.)

S. VANSTONE.
INSULATION FOR ELECTRIC WIRES.

No. 470,883. Patented Mar. 15, 1892.

Witnesses.
Joseph J. Scholfield
Mark H. Heath

Inventor:
Samuel Vanstone
per S. Scholfield
Attorney

THE NORRIS PETERS CO., PHOTO-LITHO., WASHINGTON, D. C.

UNITED STATES PATENT OFFICE.

SAMUEL VANSTONE, OF PROVIDENCE, RHODE ISLAND, ASSIGNOR TO HIMSELF AND FREDERIC A. FAIRBROTHER, JR., OF SAME PLACE.

INSULATION FOR ELECTRIC WIRES.

SPECIFICATION forming part of Letters Patent No. 470,883, dated March 15, 1892.

Application filed March 21, 1890. Serial No. 344,802. (No model.)

*To all whom it may concern:*

Be it known that I, SAMUEL VANSTONE, a citizen of the United States, residing at Providence, in the county of Providence and State of Rhode Island, have invented a new and useful Improvement in Insulating-Coverings for Electric Wires, of which the following is a specification.

In electric wires for conducting currents of high tension it is very desirable to provide a perfect insulating-covering for the same to protect life and property from the effect of the lateral escape of the electric current; and it is the object of my invention to provide an insulating-covering which will embody the required protecting qualities in the highest degree; and my invention consists in an articulated insulating-covering formed of glass or other rigid non-conducting material and in the combination therewith of a protecting-covering of flexible material in longitudinally-divided sections, as hereinafter fully set forth.

Figure 1:
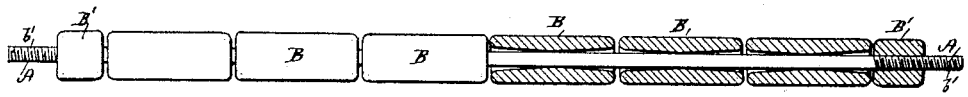
Figure 2:
Figure 3:
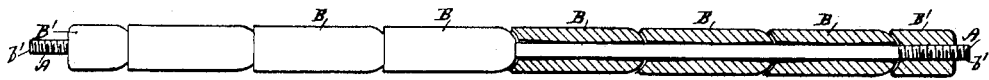
Figure 6:
Figure 5:
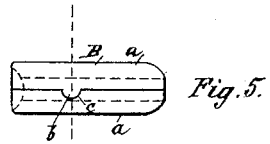
Figure 4:
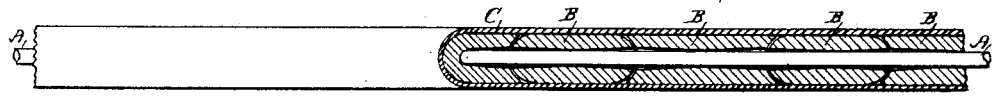

Figure 1 represents a longitudinal section showing an electric wire provided with my improved rigid insulating-covering. Fig. 2 represents the same provided with an exterior flexible covering. Fig. 3 represents a longitudinal section showing the rigid insulating-sections as provided with socket-jointed ends. Fig. 4 represents a modification of the same, provided with an exterior flexible covering. Fig. 5 represents a side view showing one of the rigid insulating-sections as made in longitudinally-divided halves for convenience of application to the wire. Fig. 6 represents a transverse section taken in the line *x x* of Fig. 5.

In the accompanying drawings, Fig. 1, A represents the wire, to which the insulating-covering is applied, the said covering consisting of rigid glass sections B B, which are longitudinally divided, as shown in Figs. 5 and 6, arranged to abut each other upon the wire and which are held in position upon the wire by means of the non-conducting nuts B′ B′, which are placed upon the screw-threaded ends *b′* of the conducting-wire A, and the wire so covered with the non-conducting glass sections B can be coiled for transportation, as in the case of ordinary wire, the glass sections B forming a perfect insulator for the same. Instead of having the sections B to abut squarely at their ends, the one can be made concave and the other convex, forming a socket-joint, as shown in Figs. 3 and 4, thus providing for an easy bending movement of the wire and forming a practically continuous covering of glass or other rigid non-conducting material, which by reason of its articulated construction is capable of being bent and coiled, as required.

In order to prevent access of moisture to the wire A from any source and to hold the sections B together throughout the whole length of the wire, a lead pipe or a braided or woven tubular covering C may be applied to the rigid insulating-sections B, as shown in Fig. 4, and such braided or woven coverings may be saturated with wax, paraffine, or other insulating materials, as heretofore employed for covering electric wires.

The tubular sections B, when made entire, are passed over the end of the wire to their proper position, and when the same are made in longitudinally-divided parts *a a*, as shown in Fig. 5, they may be applied directly to the side of the wire, and the braided covering will then serve to hold them in their proper position, and the said parts *a a* can be prevented from sliding upon each other by means of the projections *b b*, which enter the corresponding opposite recesses *c c*.

When the rigid insulating-sections B are inclosed in a flexible protecting-tube C of lead, moisture can be entirely excluded from the wire.

The sections B are preferably made of glass; but other rigid insulating materials can be employed. The section-holding nuts B′ B′ may be made of glass or other non-conducting material or of metal provided with a covering of such non-conducting material, by means of which the connecting-joint of the electric wires will be insulated.

Any desired number of electric wires may be inclosed by the insulating-sections B, instead of the single wire A shown in the drawings.

I am aware that rigid abutting tubular sections of glass or other non-conducting material have been heretofore employed for insulating electric wires, and that such tubular sections have been made with concave and convex ends to form a socket-joint. I therefore make no broad claim to said abutting tubular sections or to the socket-joints.

I claim as my invention—

1. An insulating-covering for electric wires, formed of abutting longitudinally-divided sections of rigid non-conducting material, the abutting ends of which form a socket-joint, substantially as described.

2. An insulating-covering for electric wires, formed of abutting longitudinally-divided sections of rigid non-conducting material provided with a continuous covering of flexible material, which serves to hold the parts of the longitudinally-divided sections together, substantially as described.

3. An insulating-covering for electric wires, formed of sections of rigid non-conducting material and having end sections secured in position upon the wire by means of a screw-thread, substantially as described.

4. An insulating-covering for electric wires, formed of longitudinally-divided sections of rigid non-conducting material provided with a continuous flexible covering of lead, substantially as described.

SAMUEL VANSTONE.

Witnesses:
SOCRATES SCHOLFIELD,
HARMON S. BABCOCK.